United States Patent
Inoue et al.

(10) Patent No.: US 9,556,956 B2
(45) Date of Patent: Jan. 31, 2017

(54) CONTROL APPARATUS AND CONTROL METHOD FOR AUTOMATIC TRANSMISSION

(71) Applicant: JATCO LTD, Fuji-shi, Shizuoka (JP)

(72) Inventors: Mamiko Inoue, Ebina (JP); Hiroyasu Tanaka, Atsugi (JP); Masato Mori, Isehara (JP)

(73) Assignee: JATCO LTD, Fuji-shi (JP)

( * ) Notice: Subject to any disclaimer, the term of this patent is extended or adjusted under 35 U.S.C. 154(b) by 0 days.

(21) Appl. No.: 14/778,362

(22) PCT Filed: Mar. 24, 2014

(86) PCT No.: PCT/JP2014/058035
§ 371 (c)(1),
(2) Date: Sep. 18, 2015

(87) PCT Pub. No.: WO2014/157065
PCT Pub. Date: Oct. 2, 2014

(65) Prior Publication Data
US 2016/0146343 A1  May 26, 2016

(30) Foreign Application Priority Data

Mar. 25, 2013 (JP) .................. 2013-062502

(51) Int. Cl.
*F16H 61/70* (2006.01)
*F16H 61/08* (2006.01)
(Continued)

(52) U.S. Cl.
CPC ............ *F16H 61/70* (2013.01); *F16H 37/022* (2013.01); *F16H 61/08* (2013.01); *F16H 61/66259* (2013.01); *F16H 2061/6615* (2013.01)

(58) Field of Classification Search
None
See application file for complete search history.

(56) References Cited

U.S. PATENT DOCUMENTS

| 5,427,579 A * | 6/1995 | Kanehara .......... F16H 61/66259 474/28 |
| 2008/0125284 A1* | 5/2008 | Tanaka .................. F16D 48/066 477/39 |

(Continued)

FOREIGN PATENT DOCUMENTS

| JP | 2000-120860 | 4/2000 |
| JP | 2006-046569 | 2/2006 |

(Continued)

*Primary Examiner* — Edwin A Young
(74) *Attorney, Agent, or Firm* — Foley & Lardner LLP (57) ABSTRACT

A control unit comprises determining unit for determining whether or not a predetermined elapsed time condition is established after a shift has been performed to a specific gear position reached by engaging a specific frictional engagement element of a stepped transmission mechanism, and restricting unit for prohibiting the stepped transmission mechanism from performing a shift back to the specific gear position while allowing a continuously variable transmission mechanism to perform shifts so that an automatic transmission is controlled to a target speed ratio until the determining unit determines that the predetermined elapsed time condition is established.

5 Claims, 5 Drawing Sheets

(51) Int. Cl.
*F16H 61/662* (2006.01)
*F16H 37/02* (2006.01)
*F16H 61/66* (2006.01)

(56) References Cited

U.S. PATENT DOCUMENTS

| | | | |
|---|---|---|---|
| 2010/0248894 A1* | 9/2010 | Jozaki | F16H 61/66259 477/44 |
| 2011/0048552 A1* | 3/2011 | Dohi | F16H 59/72 137/511 |
| 2012/0059556 A1 | 3/2012 | Tanaka et al. | |
| 2012/0059558 A1 | 3/2012 | Tanaka et al. | |
| 2012/0083977 A1 | 4/2012 | Tanaka et al. | |

FOREIGN PATENT DOCUMENTS

| | | |
|---|---|---|
| JP | 2012-057698 | 3/2012 |
| JP | 2012-057710 | 3/2012 |
| JP | 2012-077794 | 4/2012 |

* cited by examiner

CONTROL APPARATUS AND CONTROL METHOD FOR AUTOMATIC TRANSMISSION

TECHNICAL FIELD

This invention relates to a control apparatus for an automatic transmission comprising a continuously variable transmission mechanism and a stepped transmission mechanism.

BACKGROUND ART

A conventional transmission comprises a continuously variable transmission mechanism (a variator), and a stepped auxiliary transmission mechanism that is switched between a plurality of forward gear positions selectively. With this type of transmission, in comparison with a continuously variable transmission constituted by only a variator, a shift region can be expanded by the auxiliary transmission mechanism, enabling improvements in engine efficiency and fuel efficiency.

JP2012-57710A discloses a conventional transmission of this type having a so-called manual shift mode, in which control is performed to allow a driver to select a speed ratio by performing a shift operation. JP2012-57710A discloses a continuously variable transmission having a manual shift mode in which a through speed ratio constituting a speed ratio of the entire transmission is caused to reach a target speed ratio by modifying only a speed ratio of a variator, whereupon an auxiliary transmission mechanism is shifted while varying the speed ratio of the variator in response to variation in a speed ratio of the auxiliary transmission mechanism so that the through speed ratio does not vary.

Further, as described in JP2000-120860A, when a multiple shift from a first gear position to a second gear position and from the second gear position to the first gear position is performed repeatedly in a stepped automatic transmission, a thermal load exerted on a frictional engagement element may increase, leading to a reduction in durability. To prevent this problem, JP2000-120860A discloses a control apparatus for an automatic transmission, the control apparatus comprising multiple shift detecting unit for detecting a multiple shift, and multiple shift prohibiting unit for prohibiting the multiple shift when an integrated value reaches a set value while the multiple shift is underway.

SUMMARY OF INVENTION

In a continuously variable transmission comprising a variator and an auxiliary transmission mechanism, such as that described in JP2012-57710A, control is implemented to reduce shift shock generated when a shift is performed in the auxiliary transmission mechanism by ensuring that shifts are performed mainly by the variator and opportunities for performing a shift in the auxiliary transmission mechanism are reduced. By implementing this control, the durability of the frictional engagement elements used in the auxiliary transmission mechanism with respect to a thermal load exerted thereon can be improved, and reductions in cost, size, and weight can be achieved.

On the other hand, when the manual shift mode is set such that the driver can select the speed ratio at will, instructions to perform a shift using the auxiliary transmission mechanism may be issued frequently in accordance with operations performed by the driver. When shifts are performed in this manner, the thermal load exerted on the frictional engagement elements may increase, leading to a reduction in the durability of the frictional engagement elements.

To prevent a reduction in the durability of the frictional engagement elements, control may be performed to prohibit shifts when the integrated value reaches the set value, as described in JP2000-120860A. In this case, however, a situation in which a shift is not executed in response to an instruction from the driver may arise, leading to a reduction in drivability. Moreover, it may be difficult to achieve an improvement in a power performance of a vehicle during acceleration and the like.

In another method of improving the durability of the frictional engagement elements, a thermal capacity of the frictional engagement elements may be increased by increasing an amount of friction material or the like. In this case, however, the transmission increases in weight and size, leading to new problems such as difficulty in installing the transmission in the vehicle and a reduction in fuel efficiency.

This invention has been designed in consideration of the problems described above, and an object thereof is to provide a control apparatus for an automatic transmission, the automatic transmission comprising a continuously variable transmission mechanism and a stepped transmission mechanism, with which drivability can be secured without reductions in fuel efficiency and ease of installation in a vehicle, even in a manual shift mode.

According to one aspect of the present invention, an automatic transmission, comprising an automatic transmission constituted by a continuously variable transmission mechanism having a continuously modifiable speed ratio and a stepped transmission mechanism that is connected in series to the continuously variable transmission mechanism and that can be switched between a plurality of gear positions by engaging and disengaging a plurality of frictional engagement elements, and a control unit that controls the automatic transmission to a target speed ratio by modifying the speed ratio of the continuously variable transmission mechanism and the gear position of the stepped transmission mechanism. The control unit comprises a determining unit for determining whether or not a predetermined elapsed time condition is established after a shift has been performed to a specific gear position reached by engaging a specific frictional engagement element of the stepped transmission mechanism, and a restricting unit for prohibiting the stepped transmission mechanism from performing a shift back to the specific gear position while allowing the continuously variable transmission mechanism to perform shifts so that the automatic transmission is controlled to the target speed ratio until the determining unit determines that the predetermined elapsed time condition is established.

According to another aspect of the present invention, a control method employed in a control apparatus for an automatic transmission, the control apparatus for an automatic transmission comprising an automatic transmission constituted by a continuously variable transmission mechanism having a continuously modifiable speed ratio and a stepped transmission mechanism that is connected in series to the continuously variable transmission mechanism and that can be switched between a plurality of gear positions by engaging and disengaging a plurality of frictional engagement elements, and a control unit that controls the automatic transmission to a target speed ratio by modifying the speed ratio of the continuously variable transmission mechanism and the gear position of the stepped transmission mechanism. The control method comprises determining whether or not a predetermined elapsed time condition is established after a shift has been performed to a specific gear position reached by engaging a specific frictional engagement element of the stepped transmission mechanism, and prohibiting the stepped transmission mechanism from performing a shift back to the specific gear position while allowing the continuously variable transmission mechanism to perform shifts so that the automatic transmission is controlled to the target speed ratio until the determining unit determines that the predetermined elapsed time condition is established.

According to the aspect described above, after a shift is performed to the specific gear position reached by engaging the specific frictional engagement element, a shift back to the specific gear position is prohibited until the predetermined elapsed time condition is established such that shifts are allowed to be performed only by the continuously variable transmission mechanism. According to this configuration, a shift can be performed to the target speed ratio using the continuously variable transmission mechanism while prohibiting the stepped transmission mechanism from performing a shift that causes the thermal load exerted on the frictional engagement element to increase. Accordingly, a reduction in drivability can be prevented without the need to increase the capacity of the frictional engagement elements, and as a result, reductions in fuel efficiency and ease of installation in a vehicle do not occur.

DESCRIPTION OF EMBODIMENTS

An embodiment of this invention will be described below with reference to the attached figures.

Figure 1:
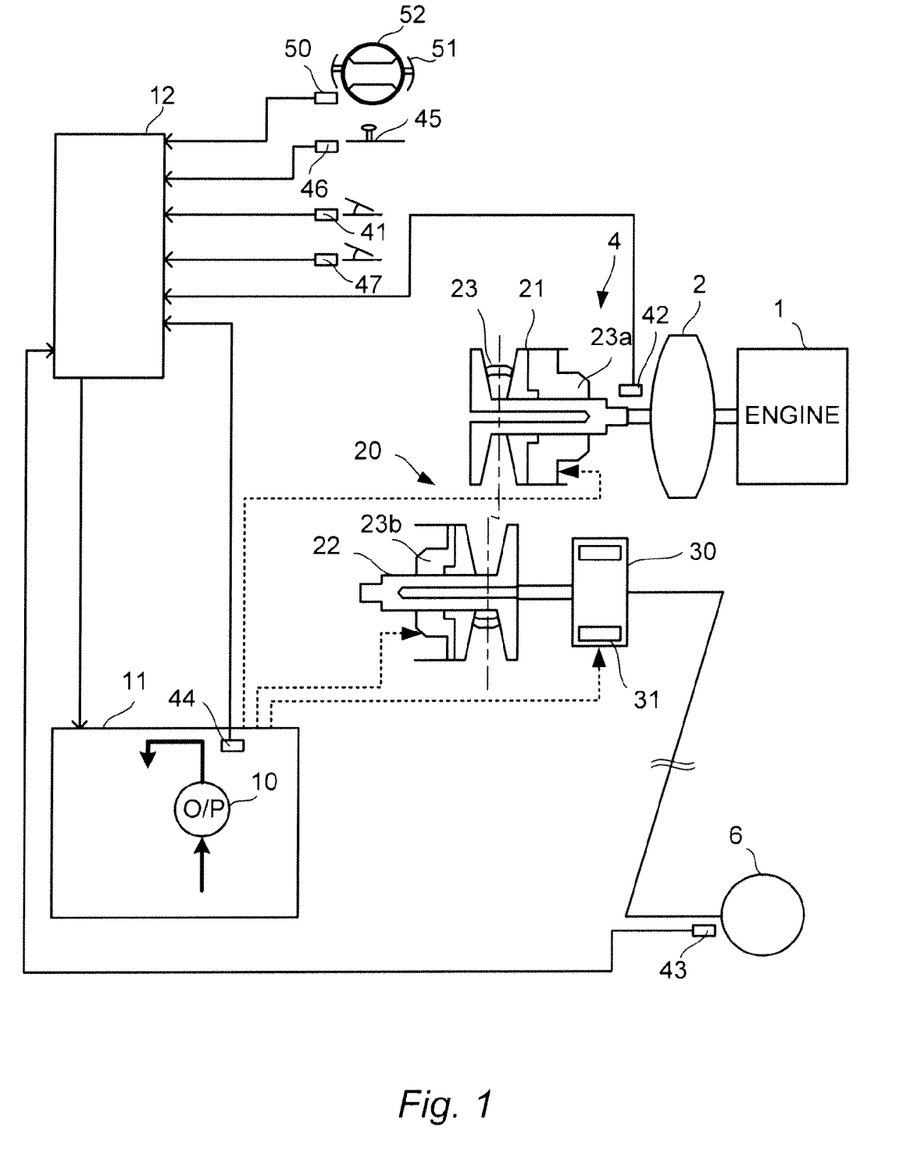
FIG. 1 is a schematic view showing a configuration of a vehicle in which a continuously variable transmission according to an embodiment is installed.

FIG. 1 is a schematic view showing a configuration of a vehicle in which a continuously variable transmission according to this embodiment is installed.

The vehicle comprises an engine 1 as a power supply. Output rotation from the engine 1 is transmitted to a drive wheel via a torque converter 2 having a lock-up clutch, an automatic transmission (referred to simply as a "transmission 4" hereafter), and a final reduction gear 6.

The vehicle is provided with an oil pump 10 that is driven using a part of the power from the engine 1, a hydraulic control circuit 11 that regulates oil pressure from the oil pump 10 and supplies the regulated oil pressure to respective sites of the transmission 4, and a transmission controller 12 that controls the hydraulic control circuit 11.

The transmission 4 comprises a continuously variable transmission mechanism (referred to hereafter as a "variator 20"), and a stepped transmission mechanism (referred to hereafter as an "auxiliary transmission mechanism 30") provided in series with the variator 20.

The variator 20 is a belt type continuously variable transmission mechanism comprising a primary pulley 21, a secondary pulley 22, and a V belt 23 wrapped around the pulleys 21, 22. The pulleys 21, 22 each comprise a fixed conical plate, a movable conical plate disposed such that a sheave surface thereof opposes the fixed conical plate, whereby a V groove is formed between the movable conical plate and the fixed conical plate, and a hydraulic cylinder 23a, 23b provided on a back surface of the movable conical plate in order to displace the movable conical plate in an axial direction. When oil pressure supplied to the hydraulic cylinders 23a, 23b is adjusted, a width of the V groove varies, leading to variation in a contact radius between the V belt 23 and the respective pulleys 21, 22, and as a result, a speed ratio vRatio of the variator 20 varies continuously.

The auxiliary transmission mechanism 30 is a two-forward speed, single-reverse speed transmission mechanism. The auxiliary transmission mechanism 30 comprises a planetary gear mechanism, and a plurality of frictional engagement elements 31 (a Low brake, a High clutch, and a Rev brake, for example) that modify a link condition of the planetary gear mechanism.

A gear position of the auxiliary transmission mechanism 30 is modified by adjusting oil pressure supplied to the frictional engagement elements 31 in order to modify engagement/disengagement conditions of the frictional engagement elements 31. For example, when the Low brake is engaged and the High clutch and Rev brake are disengaged, the gear position of the auxiliary transmission mechanism 30 is set at a first speed. When the High clutch is engaged and the Low brake and Rev brake are disengaged, the gear position of the auxiliary transmission mechanism 30 is set at a second speed having a smaller speed ratio than the first speed. When the Rev brake is engaged and the Low brake and High clutch are disengaged, the gear position of the auxiliary transmission mechanism 30 is set in reverse.

An output signal from an accelerator opening sensor 41 that detects an opening of an accelerator pedal (referred to hereafter as an "accelerator opening APO"), an output signal from a rotation speed sensor 42 that detects an input rotation speed of the transmission 4 (=a rotation speed of the primary pulley 21, referred to hereafter as a "primary rotation speed Npri"), an output signal from a vehicle speed sensor 43 that detects a travel speed of the vehicle (referred to hereafter as a "vehicle speed VSP"), an output signal from an oil temperature sensor 44 that detects an oil temperature of the transmission 4, an output signal from an inhibitor switch 46 that detects a position of a select lever 45, an output signal from a brake switch 47 that detects depression of a brake pedal, and so on are input into the transmission controller 12. Further, an output signal from a paddle switch 50 that detects an operating condition of a paddle lever 51 provided on a steering wheel 52 is input into the transmission controller 12.

On the basis of the input signals, the transmission controller 12 determines a target speed ratio, refers to a pre-recorded shift map or the like in order to generate a shift control signal with which to control the speed ratio of the variator 20 and the gear position of the auxiliary transmission mechanism 30 so that a through speed ratio Ratio serving as a speed ratio of the entire transmission 4 follows the target speed ratio, and outputs the generated shift control signal to the hydraulic control circuit 11.

The hydraulic control circuit 11 adjusts the oil pressure generated by the oil pump 10 to a required oil pressure on the basis of the shift control signal from the transmission controller 12, and supplies the adjusted oil pressure to the respective sites of the transmission 4. As a result, the speed ratio of the variator 20 and the gear position of the auxiliary transmission mechanism 30 are modified, whereby a shift is performed in the transmission 4.

Hence, the transmission controller 12 comprises an automatic shift mode in which the speed ratio of the transmission 4 is determined autonomously in accordance with a condition of the vehicle.

Note that description of operations of the transmission controller 12 and the hydraulic control circuit 11, and in particular description of a coordinated shift in which the variator 20 and the auxiliary transmission mechanism 30 are subjected to simultaneous shift control, are to be found in JP2012-57710A, filed previously by the present applicant and already published.

The transmission 4 according to this embodiment comprises a mode (a manual shift mode) in which the transmission 4 can be fixed at a predetermined speed ratio in accordance with the will of a driver.

The transmission controller 12 is provided in advance with a shift map (a manual shift mode shift map) comprising a plurality of shift lines on which the speed ratio is fixed at predetermined speed ratios. When a shift instruction is issued by the driver in the manual shift mode, control is performed to fix the speed ratio at the instructed shift line.

Figure 2:
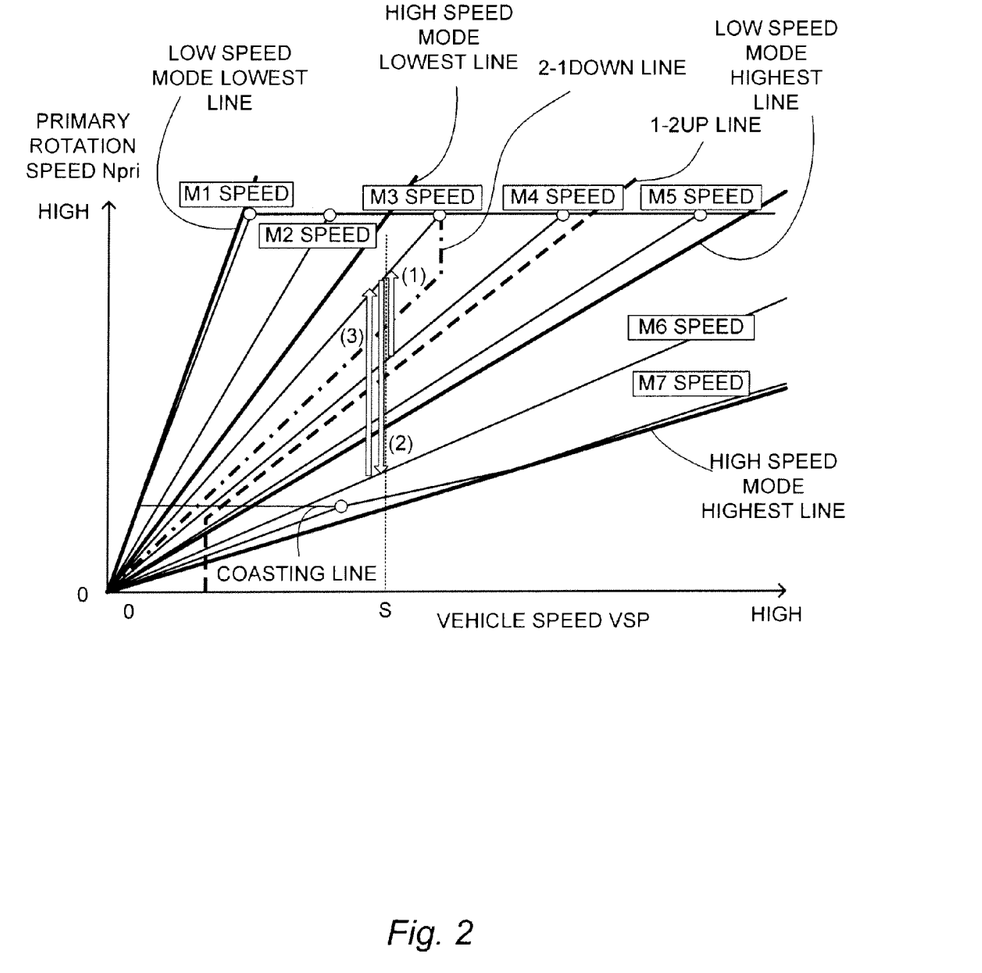
FIG. 2 is an illustrative view showing an example of a manual shift mode shift map according to this embodiment of this invention.

FIG. 2 is an illustrative view showing an example of the manual shift mode shift map according to this embodiment.

When the driver wishes to move to the manual shift mode, the driver issues an instruction to move to the manual shift mode by operating the select lever 45 or the paddle lever 51 provided on the steering wheel 52. Upon reception of the instruction, the transmission controller 12 modifies the shift map to the manual shift mode shift map shown in FIG. 2. As a result, the manual shift mode is activated.

The manual shift mode shift map shown in FIG. 2 is set to comprise shift lines corresponding to a total of seven speeds, namely an M1 speed line set such that the speed ratio of the auxiliary transmission mechanism 30 substantially follows a Lowest line of a low speed mode serving as the first speed, an M7 speed line set such that the speed ratio of the auxiliary transmission mechanism 30 substantially follows a Highest line of a high speed mode serving as the second speed, and M2 to M6 speed lines set between the M1 speed line and the M7 speed line.

On the manual shift mode shift map, when the auxiliary transmission mechanism 30 is in the first speed (the low speed mode), speeds from the M1 speed to the M5 speed can be reached by shifting the variator 20. When the auxiliary transmission mechanism 30 is in the second speed (the high speed mode), speeds from the M3 speed to the M7 speed can be reached by shifting the variator 20.

To improve a driving performance of the vehicle and prevent shift shock from occurring when a shift is performed in the auxiliary transmission mechanism 30, the manual shift mode shift map is set to comprise a 1-2 UP line and a 2-1 DOWN line as shift lines of the auxiliary transmission mechanism 30.

When an instruction is issued to shift to a downshift side across the 2-1 DOWN line (an arrow (1) in FIG. 2, for example) while the auxiliary transmission mechanism 30 is in the second speed, the transmission controller 12 downshifts the auxiliary transmission mechanism 30 from the second speed to the first speed on the basis of the 2-1 DOWN line.

When an instruction is issued to shift to an upshift side across the 1-2 UP line (an arrow (2) in FIG. 2, for example) while the auxiliary transmission mechanism 30 is in the first speed, the transmission controller 12 upshifts the auxiliary transmission mechanism 30 from the first speed to the second speed on the basis of the 1-2 UP line.

In the manual shift mode, therefore, cases in which shifts can be performed between the respective shift lines using only the variator 20 and cases in which a shift is also performed in the auxiliary transmission mechanism 30 both exist.

Next, an operation performed by the transmission controller 12 in the manual shift mode will be described.

In the manual shift mode, the gear position is shifted in accordance with the will of the driver. The transmission controller 12 shifts the variator 20 and the auxiliary transmission mechanism 30 so as to obtain the instructed manual gear position. When, at this time, an instruction is issued to shift from a certain gear position to another gear position and the instructed shift straddles a shift line of the auxiliary transmission mechanism 30, an upshift or a downshift is performed in the auxiliary transmission mechanism 30. A shift is performed in the auxiliary transmission mechanism 30 by engaging and disengaging the frictional engagement elements 31 (the Low brake or the High clutch).

When shifts are performed continuously in the auxiliary transmission mechanism 30 within a brief time period in response to instructions from the driver, the frictional engagement elements 31 of the auxiliary transmission mechanism 30 are engaged and disengaged for short amounts of time. In this case, a period during which the frictional engagement elements 31 are in a slip condition lengthens, leading to an increase in a thermal load exerted on the frictional engagement elements, and as a result, a durability of the frictional engagement elements may be affected. This will be described in detail below.

The transmission 4 according to this embodiment is a continuously variable transmission comprising the variator 20 and the auxiliary transmission mechanism 30. The transmission controller 12 performs shift control so that shifts are performed mainly by the variator 20, and in the automatic shift mode opportunities for performing shifts in the auxiliary transmission mechanism 30 are minimized in order to minimize shift shock generated when a shift is performed in the auxiliary transmission mechanism 30.

By performing control in the automatic shift mode to reduce opportunities for performing shifts in the auxiliary transmission mechanism 30, the durability of the frictional engagement elements 31 used in the auxiliary transmission mechanism 30 with respect to the thermal load exerted thereon can be reduced, and as a result, reductions in cost, size, and weight can be achieved while minimizing a capacity of the frictional engagement elements 31.

On the other hand, when the manual shift mode is set such that the driver can select the speed ratio at will, the driver may issue shift instructions in response to which shifts are performed continuously in the auxiliary transmission mechanism 30. When shifts are performed in this manner, the frictional engagement elements 31 continuously enter the slip condition such that friction heat is generated, leading to an increase in the thermal load exerted on the frictional engagement elements 31, and as a result, the durability of the frictional engagement elements 31 may decrease.

To prevent a reduction in the durability of the frictional engagement elements 31, control may be performed to prohibit shifts when an integrated value of the thermal load on the frictional engagement elements 31 reaches a set value. In this case, however, shifts cannot be performed thereafter to the desired gear position of the driver, and therefore a reduction in drivability occurs, making it difficult to achieve an improvement in a power performance of the vehicle during acceleration and the like.

To improve the durability of the frictional engagement elements, a thermal capacity can be increased by increasing an amount of friction material or the like. In this case, however, the transmission increases in weight and size, leading to new problems such as difficulty in installing the transmission in the vehicle and a reduction in fuel efficiency.

Hence, in this embodiment, an increase in the thermal load exerted on the frictional engagement elements 31 of the auxiliary transmission mechanism 30 is suppressed while ensuring that the will of the driver is reflected so that drivability is secured by employing a following configuration.

In this embodiment, when a shift is performed in the auxiliary transmission mechanism 30 and the shift is constituted by a first shift to a specific gear position from another gear position (a downshift from the second speed to the first speed, for example) and a second shift from the specific gear position to the other gear position (an upshift from the first speed to the second speed, for example), the transmission controller 12 measures a time in which the frictional engagement element 31 is engaged during the first shift and the second shift.

When an instruction is then issued to perform a third shift back to the specific gear position from the other gear position (a downshift from the second speed to the first speed, for example), the transmission controller 12 determines whether or not to prohibit execution of the third shift in accordance with an elapsed time condition based on the measured time. When shifting of the auxiliary transmission mechanism 30 is prohibited but a shift to the instructed gear position can be achieved by shifting the variator 20 alone, the shift is performed by the variator 20.

Figure 3A:
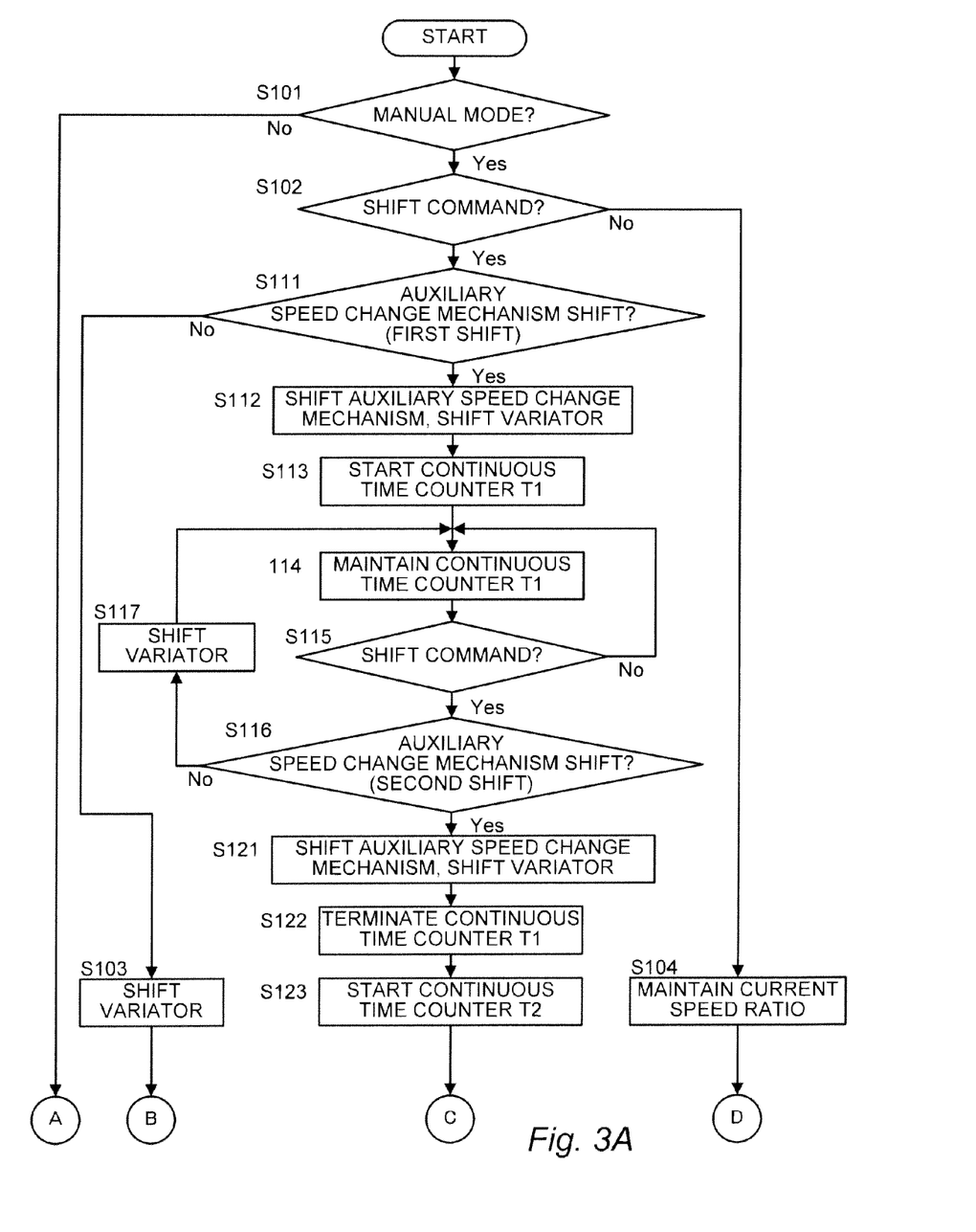
FIG. 3A is a flowchart showing shift control executed in a manual shift mode according to this embodiment of this invention.
Figure 3B:
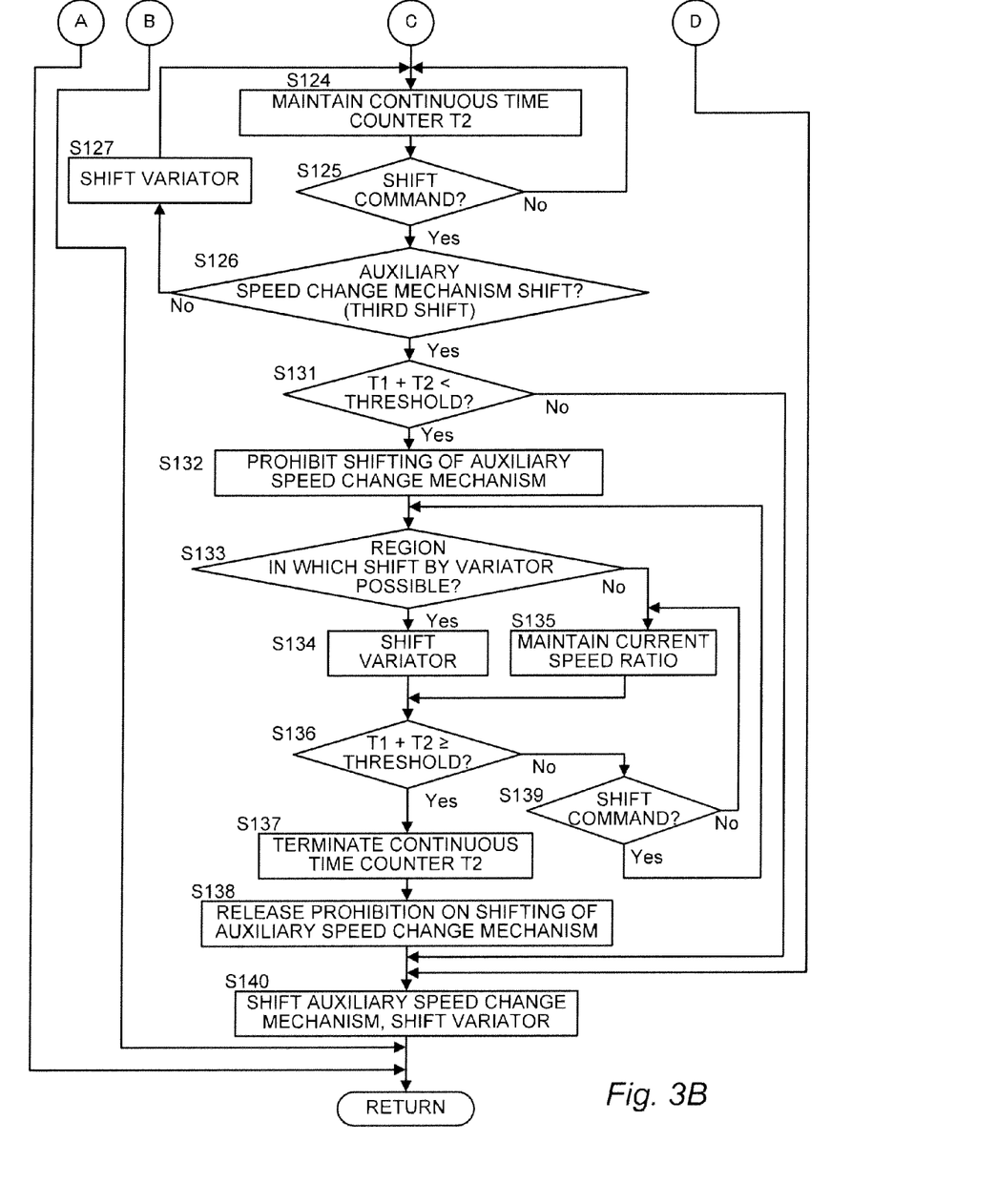
FIG. 3B is a flowchart showing the shift control executed in the manual shift mode according to this embodiment of this invention.

FIGS. 3A and 3B are flowcharts showing shift control executed by the transmission controller 12 according to this embodiment of this invention.

The flowcharts shown in FIGS. 3A and 3B show control executed by the transmission controller 12 at predetermined period intervals (intervals of 10 ms, for example) when the transmission 4 is shifted in the manual shift mode.

First, in a step S101, the transmission controller 12 determines whether or not the transmission 4 is in the manual shift mode. The transmission controller 12 determines that the transmission 4 is in the manual shift mode when the driver has issued an instruction to move to the manual shift mode by operating the select lever 45 or the paddle lever 51 provided on the steering wheel 52.

After determining that the transmission 4 is not in the manual shift mode, the transmission controller 12 terminates the current flowchart and returns to other processing. When an instruction is issued by the driver to terminate the manual shift mode and move to the automatic shift mode while the flowchart is underway, the transmission controller 12 temporarily terminates the processing of the flowchart and controls the speed ratio of the transmission 4 in the automatic shift mode.

After determining that the transmission 4 is in the manual shift mode, the transmission controller 12 determines whether or not a shift instruction has been issued by the driver in the manual shift mode (S102).

After determining that a shift instruction has not been issued, the transmission controller 12 controls the transmission 4 so as to maintain the current speed ratio of the transmission 4 (S104), and then temporarily terminates the processing of the current flowchart in order to return to other processing.

When it is determined that a shift instruction has been issued, the routine advances to a step S111, in which the transmission controller 12 determines whether or not it is necessary to shift the auxiliary transmission mechanism 30 in order to modify the current speed ratio to the instructed speed ratio (S111).

The transmission controller 12 refers to the manual shift mode map described above, and determines that the instructed shift requires a shift in the auxiliary transmission mechanism 30 when the instructed shift straddles the 1-2 UP line or the 2-1 DOWN line.

When it is determined that the instructed shift does not require a shift in the auxiliary transmission mechanism 30, this means that the instructed speed ratio can be realized by shifting the variator 20 alone. In this case, the routine advances to a step S103, in which the transmission controller 12 shifts the speed ratio of the variator 20 to the instructed gear position. The transmission controller 12 then temporarily terminates the processing of the current flowchart, and returns to other processing.

When it is determined that the instructed shift requires a shift in the auxiliary transmission mechanism 30, the routine advances to a step S112, in which the transmission controller 12 performs a shift (an upshift or a downshift) in the auxiliary transmission mechanism 30 in order to shift to the instructed gear position.

In the step S112, the transmission controller 12 executes a coordinated shift by starting to shift the auxiliary transmission mechanism 30 and starting to shift the variator 20 together.

During the coordinated shift executed in this manner, the transmission controller 12 starts to measure a continuous time following a point at which the frictional engagement element 31 of the auxiliary transmission mechanism 30 enters a steady state using a continuous time counter T1 (S113).

Time measurement using the continuous time counter T1 is performed by, for example, resetting the continuous time counter T1, obtaining a timer value that is incremented at predetermined intervals, and adding the obtained value to the continuous time counter T1.

When the frictional engagement element 31 is in the steady state, this means that slippage of the frictional engagement element 31 has converged such that the frictional engagement element 31 is in an engaged condition or a disengaged condition. For example, when an upshift (a 1-2 shift) is performed in the auxiliary transmission mechanism 30, the Low brake is disengaged from the engaged condition and the High clutch is engaged from the disengaged condition. At this time, the disengagement side frictional engagement element 31 is caused to slip while increasing an engagement capacity of the engagement side frictional engagement element 31 until engagement of the engagement side frictional engagement element 31 is complete, whereupon the disengagement side frictional engagement element 31 is disengaged.

During this series of operations, slippage occurs in at least one of the frictional engagement elements 31 when a difference is generated between an input rotation speed and an output rotation speed. In this embodiment, a condition in which a difference exists in the frictional engagement element 31 between the input rotation speed and the output rotation speed is referred to as a "slip condition". In the slip condition, differential rotation occurs between friction plates of the frictional engagement element 31, and as a result, friction heat is generated.

The slip condition of the frictional engagement element 31 subsequently converges such that the engagement side frictional engagement element 31 enters the engaged condition (a condition in which the difference between the input rotation speed and the output rotation speed disappears) or the disengagement side frictional engagement element 31 enters the disengaged condition in which no torque is transmitted thereby. This condition is referred to as a "steady state".

The transmission controller 12 starts to measure time using the continuous time counter T1 in the step S113 after detecting that the frictional engagement element 31 has entered the steady state from the slip condition following the start of the shift in the auxiliary transmission mechanism 30, and continues to measure time using the continuous time counter T1 until time measurement is terminated, as will be described below (S114).

Next, the transmission controller 12 determines whether or not a further shift instruction has been issued by the driver in the manual shift mode following the step S102 (S115). After determining that a shift instruction has not been issued, the transmission controller 12 returns to the step S114 in order to continue to measure time using the continuous time counter T1.

When it is determined that a further shift instruction has been issued, the routine advances to a step S116, in which the transmission controller 12 determines whether or not the instructed shift requires a shift in the auxiliary transmission mechanism 30.

When it is determined that the instructed shift does not require a shift in the auxiliary transmission mechanism 30, this means that the instructed speed ratio can be realized by shifting the variator 20 alone. In this case, the routine advances to a step S117, in which the transmission controller 12 performs control to shift the variator 20 to the instructed speed ratio. The transmission controller 12 then returns to the step S114 in order to continue the processing.

When it is determined that the instructed shift requires a shift in the auxiliary transmission mechanism 30, this means that a shift (a second shift) must be performed in the auxiliary transmission mechanism 30 in order to achieve the instructed speed ratio. In this case, the transmission controller 12 advances to a step S121 in order to start shift processing on the auxiliary transmission mechanism 30.

During the shift processing, the frictional engagement element 31 enters the slip condition, as described above. Hence, the frictional engagement element 31 in the steady state in the step S113 leaves the steady state at the point of the step S121.

In a step S122, therefore, the transmission controller 12 terminates the time measurement started in the step S113 using the continuous time counter T1, and records the value of the continuous time counter T1 at the time measurement termination point.

Next, the transmission controller 12 starts to measure time using a continuous time counter T2 in a step S123 after detecting that the frictional engagement element of the auxiliary transmission mechanism 30 has entered the steady state from the slip condition following the start of the shift in the step S121, and continues to measure time using the continuous time counter T2 until a time measurement termination condition is established (S124).

Time measurement using the continuous time counter T2, similarly to time measurement using the continuous time counter T1, is performed by, for example, resetting the continuous time counter T2, obtaining a timer value that is incremented at predetermined intervals, and adding the obtained value to the continuous time counter T2.

Here, the transmission controller 12 determines whether or not a further shift instruction has been issued by the driver in the manual shift mode following the step S115 (S125). After determining that a shift instruction has not been issued, the transmission controller 12 returns to the step S124 in order to continue to measure time using the continuous time counter T2.

When it is determined that a further shift instruction has been issued, the routine advances to a step S126, in which the transmission controller 12 determines whether or not the instructed shift requires a shift in the auxiliary transmission mechanism 30.

When it is determined that the instructed shift does not require a shift in the auxiliary transmission mechanism 30, this means that the instructed speed ratio can be realized by shifting the variator 20 alone. In this case, the routine advances to a step S127, in which the transmission controller 12 performs control to shift the variator 20 to the instructed speed ratio. The transmission controller 12 then returns to the step S124 in order to continue the processing.

When it is determined that the instructed shift requires a shift in the auxiliary transmission mechanism 30, the routine advances to a step S131.

Here, shifting the auxiliary transmission mechanism 30 means that the frictional engagement elements of the auxiliary transmission mechanism 30 enter the slip condition again. In the auxiliary transmission mechanism 30 according to this embodiment in particular, shifts are performed between the first speed and the second speed by engaging and disengaging two frictional engagement elements 31 (the Low brake and the High clutch) during forward travel.

Therefore, when the third shift is performed in the auxiliary transmission mechanism 30 after performing the first shift in the auxiliary transmission mechanism 30 in the step S111 and performing the second shift in the auxiliary transmission mechanism 30 in the step S116, the same frictional engagement element 31 (the Low brake, for example) enters the slip condition again between the first shift and the third shift. When a sufficient amount of time does not elapse between a point at which the frictional engagement element 31 (the Low brake, for example) enters the slip condition and a point at which the frictional engagement element 31 enters the slip condition again, the thermal load on the frictional engagement element 31 may increase, and as a result, the durability of the frictional engagement element 31 (the Low brake, for example) may deteriorate.

Hence, when a period in which the frictional engagement element 31 is in the steady state, i.e. not in the slip condition, between the first shift and the third shift does not satisfy a predetermined elapsed time condition, the transmission controller 12 prohibits the third shift.

When it is determined in the step S126 that the instructed shift requires a shift in the auxiliary transmission mechanism 30, the routine advances to a step S131, where the transmission controller 12 calculates a sum (T1+T2) of a current value of the continuous time counter T2, with which time measurement was started in the step S123, and the value of the continuous time counter T1 recorded in the step S122, and determines whether or not the sum (T1+T2) is smaller than a predetermined threshold. Time measurement by the continuous time counter T2 is not stopped at the point of the step S131.

The continuous time counter T1 and the continuous time counter T2 respectively indicate cumulative values of the time during which the frictional engagement element 31 is in the steady state (the engaged condition). Hence, the sum (T1+T2) indicates a period in which the frictional engagement element 31 does not generate heat and is cooled by lubricating oil.

When the frictional engagement element 31 enters the slip condition, a temperature of the frictional engagement element 31 increases due to friction heat. In the steady state, the frictional engagement element 31 is cooled by lubricating oil. When the first shift, the second shift, and the third shift are performed as described above, the frictional engagement element 31 enters the slip condition and the steady state repeatedly.

As long as the steady state period is longer than the predetermined elapsed time condition at this time, the frictional engagement element 31 is cooled sufficiently so that when the frictional engagement element 31 next enters the slip condition, the thermal load on the frictional engagement element 31 does not increase to such an extent that the durability thereof is affected.

When, on the other hand, the period in which the frictional engagement element 31 is in the steady state does not satisfy the predetermined elapsed time condition, or in other words when the period from the point at which the frictional engagement element 31 first enters the slip condition to the point at which the frictional engagement element 31 next enters the slip condition is short, the frictional engagement element 31 is not cooled sufficiently. Therefore, when the frictional engagement element 31 next enters the slip condition, friction heat may be generated such that the thermal load exerted on the frictional engagement element 31 exceeds a durability limit determined by design.

When it is determined in the step S131 that the sum (T1+T2) of the continuous time counter T1 and the continuous time counter T2 equals or exceeds the predetermined threshold, the transmission controller 12 determines that the frictional engagement element 31 has been sufficiently cooled in preparation for next entering the slip condition. Accordingly, the routine advances to a step S140, in which a shift is performed in the auxiliary transmission mechanism 30 and a shift is performed simultaneously in the variator 20.

When, on the other hand, it is determined in the step S131 that the sum (T1+T2) of the continuous time counter T1 and the continuous time counter T2 is smaller than the predetermined threshold, the transmission controller 12 determines that the frictional engagement element 31 has not been cooled sufficiently in preparation for next entering the slip condition. In this case, the routine advances to a step S132, in which shifting of the auxiliary transmission mechanism 30 is prohibited.

Next, the routine advances to a step S133, where the transmission controller 12 determines whether or not the gear position instructed by the driver corresponds to a speed ratio that can be reached by shifting the variator 20 alone while shifting of the auxiliary transmission mechanism 30 remains prohibited.

On the manual shift mode shift map shown in FIG. 2, as described above, the 1-2 UP line and the 2-1 DOWN line are set in consideration of shock prevention and the driving performance. Meanwhile, when the auxiliary transmission mechanism 30 is in the first speed or the second speed, gear positions can be reached within a range that crosses the 1-2 UP line and the 2-1 DOWN line by shifting the variator 20.

When it is determined in the step S133 that the gear position instructed by the driver corresponds to a speed ratio that can be reached by shifting the variator 20 alone, the routine advances to a step S134, in which the transmission controller 12 performs a shift to the instructed gear position by shifting the variator 20 alone.

When, on the other hand, it is determined in the step S133 that the gear position instructed by the driver corresponds to a speed ratio that cannot be reached by shifting the variator 20 alone, for example when the M2 speed is instructed while the auxiliary transmission mechanism 30 is in the second speed, the routine advances to a step S135, in which the transmission controller 12 maintains the current speed ratio. In other words, the current speed ratio is maintained without performing a shift to the speed ratio instructed by the driver.

Following the processing of the step S134 or the step S135, the routine advances to a step S136, in which the transmission controller 12 determines whether or not the sum (T1+T2) of the continuous time counter T1 and the current value of the continuous time counter T2 equals or exceeds the predetermined threshold.

When it is determined that the sum (T1+T2) is still smaller than the predetermined threshold, the transmission controller 12 advances to a step S139 while continuing to prohibit shifting of the auxiliary transmission mechanism 30. In the step S139, the transmission controller 12 determines whether or not a further shift instruction has been issued by the driver.

When, at this time, a further shift instruction has been issued by the driver, the transmission controller 12 advances to the step S133 while continuing to prohibit shifting of the auxiliary transmission mechanism 30, similarly to a case in which the sum (T1+T2) is determined to be smaller than the predetermined threshold in the step S131. When, at this time, the gear position is reachable by shifting the variator 20, the routine advances to the step S134, where the variator 20 is shifted.

When a shift instruction has not been issued in the step S139, the routine advances to the step S135, where the current speed ratio is maintained.

When it is determined in the step S136 that the sum (T1+T2) of the continuous time counter T1 and the continuous time counter T2 equals or exceeds the predetermined threshold, this means that the frictional engagement element 31 has been sufficiently cooled, as described above. The temperature of the frictional engagement element 31 will therefore not increase beyond the limit even when the frictional engagement element 31 next enters the slip condition. Accordingly, the transmission controller 12 advances to a step S137 in order to terminate time measurement by the continuous time counter T2, and then advances to a step S138 in order to release the prohibition on shifting of the auxiliary transmission mechanism 30. The shift controller 20 then advances to a step S140, where the auxiliary transmission mechanism 30 is shifted if necessary, and the variator 20 is shifted.

More specifically, in the processing of the step S140, when it is necessary to shift the auxiliary transmission mechanism 30 from a speed ratio that was reached by shifting the variator 20 alone, i.e. without shifting the auxiliary transmission mechanism 30, in the step S134, the variator 20 is shifted together with the auxiliary transmission mechanism 30 so that the auxiliary transmission mechanism 30 is shifted while maintaining the gear position.

On the manual shift mode shift map of FIG. 2, for example, when an instruction to shift the gear position from M6 to M3 is issued in the vicinity of a vehicle speed S (an arrow (3) in FIG. 2), the instruction straddles the 2-1 DOWN line, and therefore the transmission controller 12 downshifts the auxiliary transmission mechanism 30 to the first speed. If the sum (T1+T2) is determined to be smaller than the threshold in the step S131 at this time, the M3 speed can be also reached when the auxiliary transmission mechanism 30 is in the second speed, and therefore the transmission 4 is controlled to a speed ratio corresponding to the M3 speed by shifting the variator 20 alone while continuing to prohibit shifting of the auxiliary transmission mechanism 30.

When it is then determined in the step S136 that the sum (T1+T2) equals or exceeds the predetermined threshold, the transmission controller 12 shifts the auxiliary transmission mechanism 30 from the second speed to the first speed while maintaining the speed ratio corresponding to the M3 speed, and shifts the speed ratio of the variator 20 in an opposite direction to the variation in the speed ratio of the auxiliary transmission mechanism (i.e. performs a coordinated shift). Hence, when the predetermined elapsed time condition is established, it is determined that the thermal load on the frictional engagement element 31 of the auxiliary transmission mechanism 30 has been alleviated, and therefore the prohibition on shifting of the auxiliary transmission mechanism 30 is released, whereupon control is performed in accordance with the manual shift mode shift map.

The predetermined threshold according to this embodiment is set appropriately in accordance with the capacity of the frictional engagement elements 31 of the auxiliary transmission mechanism 30 by experiment, simulation, and so on, for example, at a value ensuring that the frictional engagement element 31 is sufficiently cooled in the period extending from the point at which the frictional engagement element 31 first enters the slip condition to the point at which the frictional engagement element 31 re-enters the slip condition from the steady state so that when the frictional engagement element 31 next enters the slip condition, the temperature thereof does not increase beyond the limit.

Figure 4:
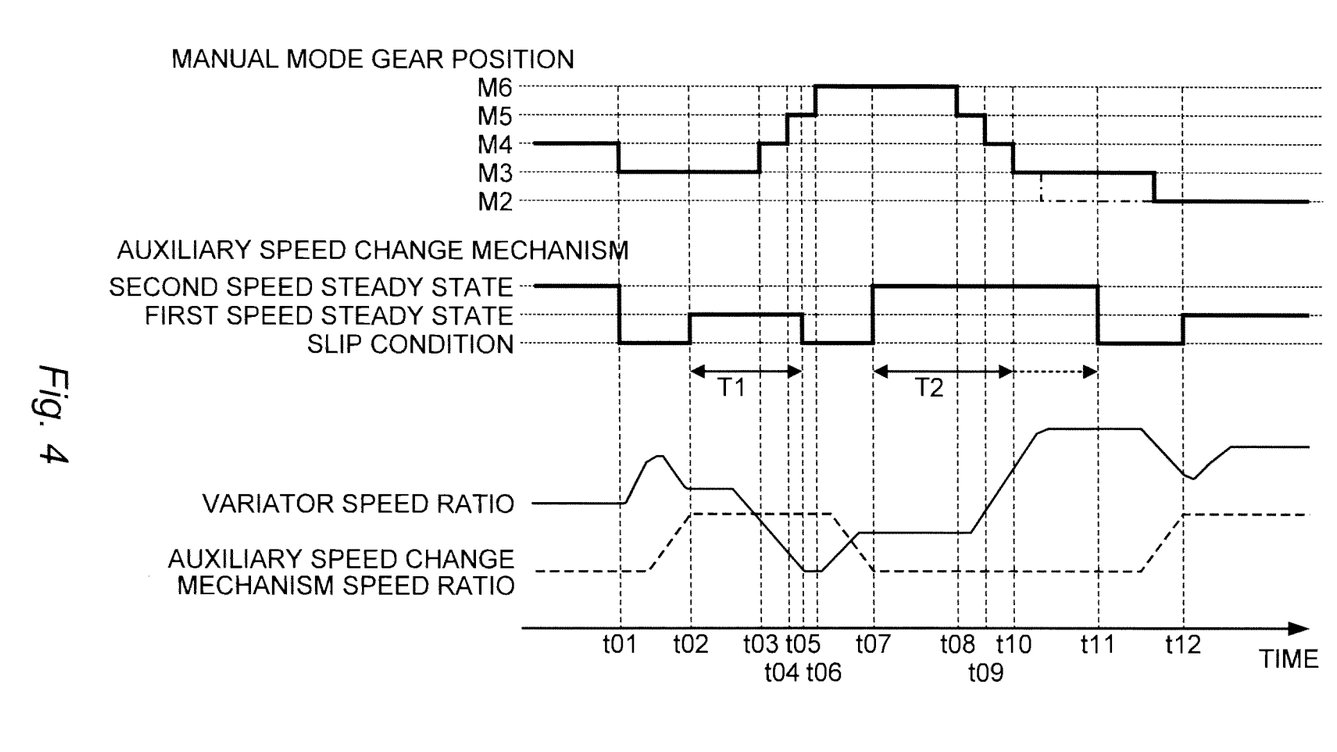
FIG. 4 is a time chart of a jump shift, serving as a reference diagram for this embodiment of this invention.

FIG. 4 is a time chart of the shift control performed in the manual shift mode according to this embodiment of this invention.

On the time chart shown in FIG. 4, the gear position instructed by the driver in the manual shift mode, the condition of the auxiliary transmission mechanism 30 (the steady state in the second speed, the steady state in the first speed, and the slip condition), the speed ratio of the variator 20, and the speed ratio of the auxiliary transmission mechanism 30 are shown in descending order on respective time axes.

On the time chart shown in FIG. 4, first, the gear position of the auxiliary transmission mechanism 30 is the second speed, and the gear position of the manual shift mode is the M4 speed.

Here, at a timing t01, the driver issues an instruction to shift from the M4 speed to the M3 speed. A shift from the M4 speed to the M3 speed crosses the 2-1 DOWN line, and therefore the transmission controller 12 performs shift control to downshift the auxiliary transmission mechanism 30 from the second speed to the first speed in accordance with the manual shift mode shift map (the first shift).

In the shift control executed during the first shift, a specific frictional engagement element 31 among the frictional engagement elements 31 enters the slip condition at the timing t01, and moves out of the slip condition into the steady state at a timing t02. As a result, the auxiliary transmission mechanism 30 is shifted to the first speed. At the timing t02 when the auxiliary transmission mechanism 30 enters the steady state, the transmission controller 12 starts to measure time using the continuous time counter T1.

While the shift is underway in the auxiliary transmission mechanism 30, the transmission controller 12 controls the speed ratio (the through speed ratio) of the transmission 4 from the M4 speed to the M3 speed while controlling the speed ratio of the variator 20 so as to suppress variation in the through speed ratio.

Next, the driver issues an instruction to shift from the M3 speed to the M6 speed via the M4 speed and the M5 speed (timings t03, t04, and t06). An upshift from the M4 speed to the M5 speed crosses the 1-2 UP line, and therefore the transmission controller 12 executes shift control to upshift the auxiliary transmission mechanism 30 from the first speed to the second speed in accordance with the manual shift mode shift map (the second shift).

In the shift control executed during the second shift, the frictional engagement element 31 is controlled to the slip condition at a timing t05. At this time, the transmission controller 12 terminates time measurement by the continuous time counter T1, and records the value reached at the time measurement termination point.

At a timing t07, the frictional engagement element 31 moves out of the slip condition into the steady state, whereby the auxiliary transmission mechanism 30 is shifted from the first speed to the second speed. At the timing t07 when the auxiliary transmission mechanism 30 enters a steady state, the transmission controller 12 starts to measure time using the continuous time counter T2.

Similarly to the first shift, while the shift is underway in the auxiliary transmission mechanism 30, the transmission controller 12 controls the speed ratio of the transmission 4 from the M3 speed to the M6 speed while controlling the speed ratio of the variator 20 so as to suppress variation in the through speed ratio.

Next, the driver issues an instruction to shift from the M7 speed to the M2 speed via the M6 speed, the M5 speed, the M4 speed, and the M3 speed (timings t08, t09, and t10). The downshift from the M4 speed to the M3 speed crosses the 2-1 DOWN line, and therefore the transmission controller 12 executes shift control to downshift the auxiliary transmission mechanism 30 from the second speed to the first speed in accordance with the manual shift mode shift map (the third shift).

In the shift control executed during the third shift, the third shift corresponds to the first shift executed at the timing t01, as described above. In the third shift, a shift is performed to the same specific gear position as that of the first shift by setting the same specific frictional engagement element 31 in the slip condition.

In this case, the transmission controller 12 performs the determination of the step S131 in FIG. 3. In other words, the transmission controller 12 determines whether or not the sum (T1+T2) of the recorded value of the continuous time counter T1 and the value measured by the continuous time counter T2 at the point where the instruction to shift from the M4 speed to the M3 speed (the timing t10) was issued is smaller than the predetermined threshold.

When the sum (T1+T2) does not reach the predetermined threshold, the transmission controller 12 determines that the frictional engagement element 31 has not been sufficiently cool in preparation for next entering the slip condition, and therefore prohibits shifting of the auxiliary transmission mechanism 30 so that the transmission 4 is controlled only to speed ratios that can be reached by shifting the variator 20 alone. In the example shown in FIG. 4, the M3 speed can be reached when the auxiliary transmission mechanism 30 is in the first speed, and therefore the transmission controller 12 shifts the transmission 4 to the M3 speed by shifting the variator 20 alone.

On the other hand, a shift from the M3 speed to the M2 speed cannot be achieved when the auxiliary transmission mechanism 30 is in the second speed. In response to the instruction (indicated by a dot-dash line) to shift to the M2 speed, therefore, the processing of the step S135 is executed in order to maintain the current speed ratio, or in other words the M3 speed.

When the sum (T1+T2) is determined to have reached or exceeded the predetermined threshold thereafter (a timing t11), the transmission controller 12 releases the prohibition on shifting of the auxiliary transmission mechanism 30 (the step S138), and executes shift control to downshift the auxiliary transmission mechanism 30 from the second speed to the first speed by executing the processing of the step S140. The M2 speed can then be reached by shift control, and therefore the transmission controller 12 shifts the auxiliary transmission mechanism 30 and the variator 20 together so as to complete the shift to the M2 speed (a timing t12).

According to this control, the auxiliary transmission mechanism 30 is prohibited from performing the third shift until the elapsed time condition in which the frictional engagement element 31 remains in the steady state is satisfied, or in other words until the sum (T1+T2) reaches or exceeds the predetermined threshold. As a result, a reduction in the durability of the frictional engagement element 31 due to an increase in the thermal load on the frictional engagement element 31 can be prevented. At this time, the transmission 4 is shifted to a reachable speed ratio by shifting the variator 20, and therefore a reduction in drivability can be prevented.

As described above, this embodiment of this invention comprises the automatic transmission 4, the automatic transmission 4 being constituted by the variator 20 serving as a continuously variable transmission mechanism having a continuously modifiable speed ratio and the auxiliary transmission mechanism 30 serving as a stepped transmission mechanism that is connected in series to the variator 20 and that can be switched between a plurality of gear positions by engaging and disengaging the plurality of frictional engagement elements 31, and the transmission controller 12 serving as a control unit that controls the automatic transmission to a target speed ratio by modifying the speed ratio of the variator 20 and the gear position of the auxiliary transmission mechanism 30.

The transmission controller 12 constitutes determining means for determining whether or not the predetermined elapsed time condition is established, or in other words whether or not the sum (T1+T2) has reached or exceeded the predetermined threshold, after a shift (the first shift) has been performed to a specific gear position that is reached by engaging a specific frictional engagement element 31 of the auxiliary transmission mechanism 30.

The transmission controller 12 constitutes restricting means for prohibiting the auxiliary transmission mechanism 30 from performing a shift (the third shift) back to the specific gear position but allowing shifts to be performed by the variator 20 alone until the determining means determines that the predetermined elapsed time condition is established, or in other words for controlling the transmission 4 to the target speed ratio while restricting operations of the transmission 4.

By employing the above configurations in this embodiment of this invention, a situation in which the frictional engagement elements 31 of the auxiliary transmission mechanism 30 enter the slip condition continuously such that the thermal load exerted thereon increases, leading to a reduction in the durability of the frictional engagement elements 31, can be prevented. Further, speed ratios that can be reached by shifting the variator 20 are realized even when shifting of the auxiliary transmission mechanism 30 is prohibited, and therefore a reduction in drivability can also be prevented without the need to increase the capacity of the frictional engagement elements 31. As a result, reductions in fuel efficiency and ease of installation in a vehicle do not occur.

The transmission controller 12 measures the period during which the specific frictional engagement element 31 is in the engaged condition (using the continuous time counter T1 and the continuous time counter T2), and prohibits the auxiliary transmission mechanism 30 from performing the shift (the third shift) back to the specific gear position when the cumulative value of the measured period does not reach the predetermined threshold. According to this configuration, a situation in which the frictional engagement elements 31 of the auxiliary transmission mechanism 30 enter the slip condition continuously such that the thermal load exerted thereon increases, leading to a reduction in the durability of the frictional engagement elements 31, can be prevented.

In this embodiment in particular, shifting is prohibited in accordance with the cumulative value of the period in which the frictional engagement element in the engaged condition, i.e. without measuring an actual temperature of the frictional engagement element 31 and without measuring an actual slippage time of the frictional engagement element. Whether or not the frictional engagement element 31 is in the engaged condition can be detected easily from the input rotation speed and the output rotation speed, and therefore there is no need to provide a new sensor. As a result, increases in the size and cost of the transmission 4 are avoided.

The transmission controller 12 comprises the automatic shift mode in which the target speed ratio is determined automatically on the basis of the operating condition, and the manual shift mode in which the target speed ratio is determined in response to an instruction issued by the driver, and when the manual shift mode is selected by the driver, the transmission controller 12 prohibits the auxiliary transmission mechanism 30 from performing a shift (the third shift) back to the specific gear position while allowing shifts to be performed by the variator 20 alone until the predetermined elapsed time condition is established, as described above.

According to this configuration, shift control is performed in the automatic shift mode to ensure that shifts are performed mainly by the variator 20, the speed ratio of which can be shifted continuously, thereby minimizing opportunities for shifts using the auxiliary transmission mechanism 30. With this configuration, the durability of the frictional engagement elements 31 used in the auxiliary transmission mechanism 30 with respect to the thermal load exerted thereon can be reduced. In the manual shift mode, on the other hand, control is performed to ensure that the thermal load on the frictional engagement elements 31 of the auxiliary transmission mechanism 30 does not increase even when a desired speed ratio is instructed by the driver, and therefore the durability of the frictional engagement elements 31 with respect to the thermal load exerted thereon can be reduced. As a result, reductions in the cost, size, and weight of the transmission 4 can be achieved.

The auxiliary transmission mechanism 30 comprises two forward travel speeds, namely the first speed serving as a first gear position and the second speed serving as a second gear position, the first speed being achieved by engaging a first frictional engagement element (the Low brake, for example) and the second speed being achieved by engaging a second frictional engagement element (the High clutch, for example). After a shift (the first shift) is performed to the first speed by engaging the first frictional engagement element 31 of the auxiliary transmission mechanism 30, the auxiliary transmission mechanism 30 is prohibited from performing a shift (the third shift) back to the first speed until the predetermined elapsed time condition is determined to be established.

When a shift is performed to the same gear position, the same frictional engagement element always enters the slip condition, leading to an increase in the thermal load thereon, and therefore, by prohibiting the shift until the period in which the frictional engagement element is in the steady state, i.e. not in the slip condition, reaches or exceeds the predetermined threshold, a situation in which the frictional engagement elements 31 of the auxiliary transmission mechanism 30 enter the slip condition continuously, leading to an increase in the thermal load exerted thereon and a corresponding reduction in the durability of the frictional engagement elements 31, can be prevented.

An embodiment of the present invention was described above, but the above embodiment is merely one example of an application of the present invention, and the technical scope of the present invention is not limited to the specific configurations of the above embodiment.

For example, in the above embodiment, a belt type continuously variable transmission mechanism is provided as the variator 20, but instead, the variator 20 may be a continuously variable transmission mechanism in which a chain is wrapped around the pulleys 21, 22 instead of the V belt 23. Alternatively, the variator 20 may be a toroidal continuously variable transmission mechanism in which a tiltable power roller is disposed between an input disc and an output disc.

In the above embodiment, the auxiliary transmission mechanism 30 is a transmission mechanism having two forward gear positions, namely the first speed and the second speed. However, the auxiliary transmission mechanism 30 maybe a transmission mechanism having three or more forward gear positions This application claims priority to Japanese Patent Application No. 2013-62502 filed with the Japan Patent Office on Mar. 25, 2013, the entire contents of which are incorporated herein by reference.

The invention claimed is:

1. A control apparatus for an automatic transmission, comprising:
an automatic transmission comprising a continuously variable speed change mechanism having a continuously modifiable speed ratio and a stepped speed change mechanism that is connected in series to the continuously variable speed change mechanism and that can be switched between a plurality of gear positions by engaging and disengaging a plurality of frictional engagement elements; and
a control unit adapted to control the automatic transmission to a target speed ratio by modifying the speed ratio of the continuously variable speed change mechanism and the gear position of the stepped speed change mechanism,
the stepped speed change mechanism comprising a first gear position and a second gear position used for forward travel, the first gear position being achieved by engaging a first frictional engagement element and the second gear position being achieved by engaging a second frictional engagement element,
the control unit comprising:
a determining unit adapted to determine whether or not a predetermined elapsed time condition is established after a shift has been performed to the first gear position reached by engaging the first frictional engagement element of the stepped speed change mechanism; and
a restricting unit adapted to prohibit the stepped speed change mechanism from performing a shift back to the first gear position while allowing the continuously variable speed change mechanism to perform shifts so that the automatic transmission is controlled to the target speed ratio until the determining unit determines that the predetermined elapsed time condition is established,
wherein the restricting unit prohibits a shift to the first gear position when a sum of a cumulative value of a period in which the first frictional engagement element is in an engaged condition or a disengaged condition and a cumulative value of a period in which the second frictional engagement element is in the engaged condition or the disengaged condition does not reach a predetermined threshold.

2. The control apparatus for an automatic transmission according to claim 1, wherein the control unit measures a period during which the specific frictional engagement element is in an engaged condition or a disengaged condition, and
prohibits the stepped speed change mechanism from performing the shift back to the specific gear position when a cumulative value of the measured period does not reach a predetermined threshold.

3. The control apparatus for an automatic transmission according to claim 1, wherein the control unit comprises an automatic shift mode in which the target speed ratio is determined automatically on the basis of an operating condition, and a manual shift mode in which the target speed ratio is determined in response to an instruction issued by a driver, and
the control unit activates the determining unit and the restricting unit when the manual shift mode is selected.

4. A control method employed in a control apparatus for an automatic transmission, the control apparatus for an automatic transmission comprising:
an automatic transmission comprising a continuously variable speed change mechanism having a continuously modifiable speed ratio and a stepped speed change mechanism that is connected in series to the continuously variable speed change mechanism and that can be switched between a plurality of gear positions by engaging and disengaging a plurality of frictional engagement elements; and
a control unit adapted to control the automatic transmission to a target speed ratio by modifying the speed ratio of the continuously variable speed change mechanism and the gear position of the stepped speed change mechanism,
the stepped speed change mechanism comprising a first gear position and a second gear position used for forward travel, the first gear position being achieved by engaging a first frictional engagement element and the second gear position being achieved by engaging a second frictional engagement element,
the control method comprising:
determining whether or not a predetermined elapsed time condition is established after a shift has been performed to the first gear position reached by engaging the first frictional engagement element of the stepped speed change mechanism;

prohibiting the stepped speed change mechanism from performing a shift back to the first gear position while allowing the continuously variable speed change mechanism to perform shifts so that the automatic transmission is controlled to the target speed ratio until determining that the predetermined elapsed time condition is established; and prohibiting a shift to the first gear position when a sum of a cumulative value of a period in which the first frictional engagement element is in an engaged condition or a disengaged condition and a cumulative value of a period in which the second frictional engagement element is in the engaged condition or the disengaged condition does not reach a predetermined threshold.

5. A control apparatus for an automatic transmission, comprising:

an automatic transmission comprising a continuously variable speed change mechanism having a continuously modifiable speed ratio and a stepped speed change mechanism that is connected in series to the continuously variable speed change mechanism and that can be switched between a plurality of gear positions by engaging and disengaging a plurality of frictional engagement elements; and a control unit adapted to control the automatic transmission to a target speed ratio by modifying the speed ratio of the continuously variable speed change mechanism and the gear position of the stepped speed change mechanism, the stepped speed change mechanism comprising a first gear position and a second gear position used for forward travel, the first gear position being achieved by engaging a first frictional engagement element and the second gear position being achieved by engaging a second frictional engagement element, the control unit comprising:

determining means for determining whether or not a predetermined elapsed time condition is established after a shift has been performed to the first gear position reached by engaging the first frictional engagement element of the stepped speed change mechanism; and restricting means for prohibiting the stepped speed change mechanism from performing a shift back to the first gear position while allowing the continuously variable speed change mechanism to perform shifts so that the automatic transmission is controlled to the target speed ratio until the determining means determines that the predetermined elapsed time condition is established, wherein the restricting means prohibits a shift to the first gear position when a sum of a cumulative value of a period in which the first frictional engagement element is in an engaged condition or a disengaged condition and a cumulative value of a period in which the second frictional engagement element is in the engaged condition or the disengaged condition does not reach a predetermined threshold.

* * * * *